May 23, 1967    H. H. KAY    3,320,929
ANIMAL-CAGE DRINKING-BOTTLE ASSEMBLY
Filed March 24, 1966
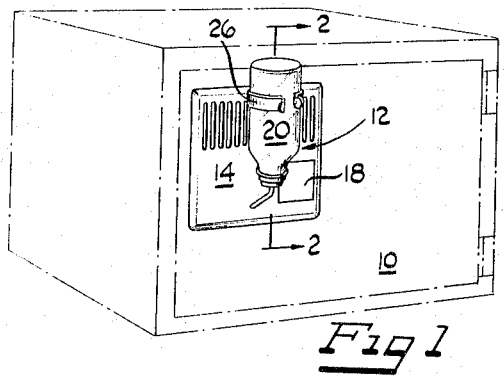
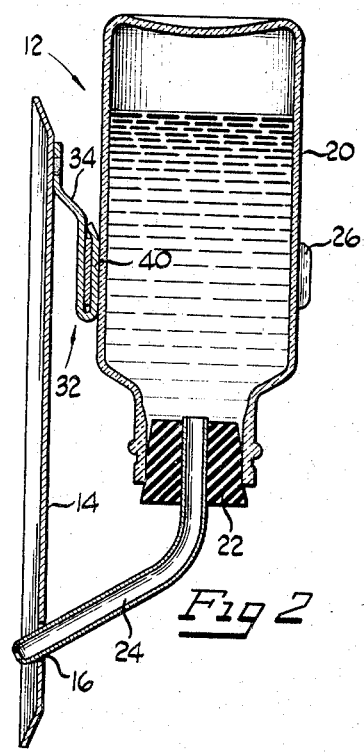
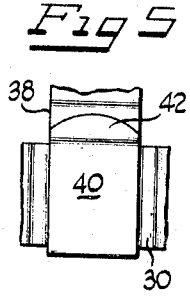
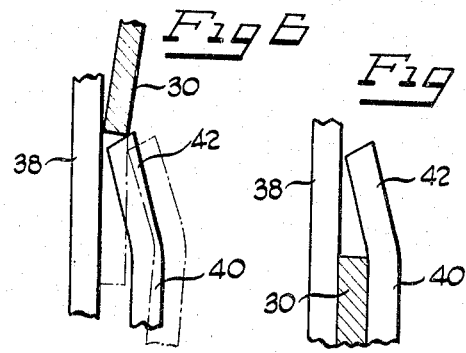
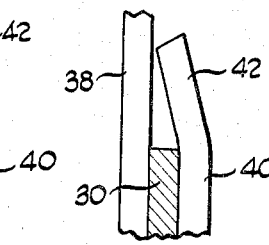
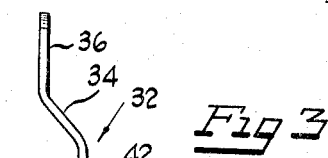
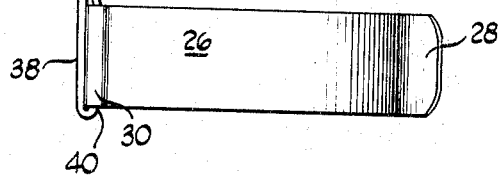
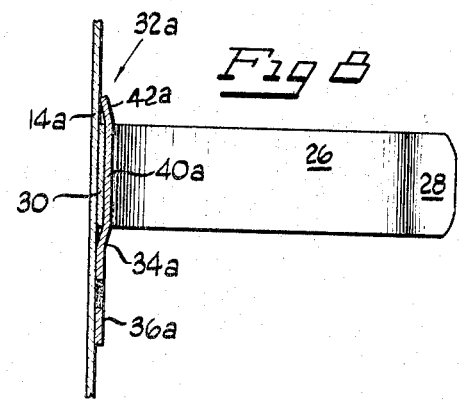
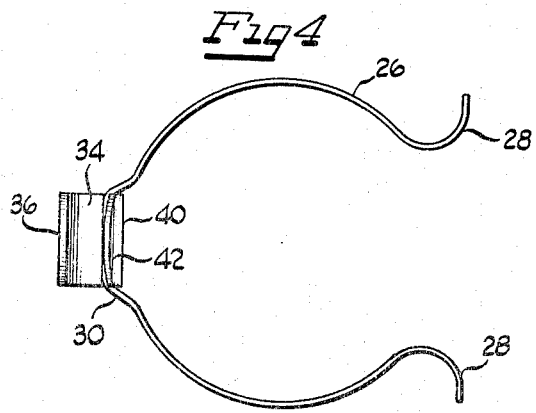
INVENTOR
HARRY H. KAY
BY Leonard G. Nierman
ATTORNEY

United States Patent Office 3,320,929
Patented May 23, 1967

3,320,929
ANIMAL-CAGE DRINKING-BOTTLE
ASSEMBLY
Harry H. Kay, % Acme Metal Products, Inc., 7757 S.
Chicago Ave., Chicago, Ill. 60619
Filed Mar. 24, 1966, Ser. No. 537,216
7 Claims. (Cl. 119—18)

This invention relates to constructions for animal cages, and more particularly to a novel construction for mounting and supporting the drinking bottle on a cage of the type used for laboratory animals in biological and similar research laboratories.

It is now more or less conventional, in many kinds of cages for laboratory animals, to provide a drinking bottle assembly with an inverted water bottle and a rigid drinking tube extending to a point readily accessible to the animal, which can suck the water (or othert fluid) therefrom. Normally, the bottle is mounted on the exterior front surface of the cage, and the tube extends downwardly and through the front wall of the cage, apertured for this purpose. Such cages are of course frequently used in large numbers, side-by-side and vertically stacked, and the front mounting of the water-bottle (and also the feeder employed for solid foods) is employed to simplify the task of periodic changing by an attendant.

Over the period of many years, there have evolved a number of structures, of varying degrees of complexity, for supporting such water bottles. Although this portion of the cage structure is relatively small and simple, and the various constructions employed appear to the untrained observer to be more or less arbitrary as regards choice, it is found in practical use that relatively small differences in construction of this portion of the cage can produce great differences in utility and it is further found that constructions suitable for use with one type of animal may be poorly suited for use with another type of animal. The present invention may best be understood with a brief discussion of the factors which produce such differences in practicality and utility.

The factors common to all such constructions are the minimizing of the labor and time consumption introduced into the maintenance operation by the particular manner selected for mounting the water bottle and at the same time adding a minimum to the cost of the cage. It is also generally required that protruding parts be readily demountable. Differences in these aspects which appear negligible when considering a single cage may be completely critical to utility and marketability of any particular cage structure for use in a modern laboratory, where great numbers of such cages may be employed in biological research, particularly in advanced types of experiments wherein the results are statistical in nature and thus require that large numbers of animals be maintained under generally identical conditions. A difference of a mere minute or so in a daily maintenance operation on each cage may be seen to produce a large differential in overall costs of experimentation over any long period. Likewise, solving the problem of maintenance labor by sacrifice of economy of manufacture is unsatisfactory, even though the added cost may appear negligible in considering a single cage.

In addition to the factors just mentioned, which are more or less universal, it is of course required that the construction be such as to assure against dislodgment of the drinking-bottle by the occupant of the cage. This aspect or requirement is found to vary over a wide range, dependent upon the type of animal. With some types of animals, the security of attachment is a negligible problem. Many animals display litlte or no tendency to manipulate the drinking-tube in any manner such as to dislodge it, either because of characteristic temperament or because of size or strength of the animal. At the other extreme, notably in the case of monkeys, it is necessary to provide relatively elaborate locking provisions to prevent the drinking bottle from being pushed or otherwise manipulated from its mount, ordinarily resulting in falling to the floor and breakage.

Because of these factors, it is found to be necessary to employ, in cages designed for various kinds of animals, substantially different forms of construction for the drinking-bottle mounting. In general, of course, the factors of ease of installation and removal, and simplicity and low-cost construction, on the one hand, and security of installation, on the other hand, are more or less opposed as design factors. In cases where the problem of dislodgment by the animal is not a necessary consideration, the assembly may be rudimentary as regards simplicity, and such a simple mount as a mere hook will suffice. At the other extreme, relatively complex constructions may be required, both as regards cost of manufacture and as regards the time and convenience of maintenance.

In the copending application of the present inventor filed Feb. 9, 1965, Ser. No. 431,350, now Patent Number 3,251,342, there is described and claimed a drinking-bottle assembly particularly designed for use on the cages of monkeys and similar animals, requiring a high degree of security against dislodgment. The construction of the invention of that application provides this high degree of security in a manner which minimizes the sacrifice of the other factors mentioned above in construction of cages for such animals.

The present invention stems from the desirability of a construction of a simpler nature, accomplishing the same general objects, but as applied to cages for animals with which the precautions need be less extreme, although substantial. In general, the present invention lies in a simple and inexpensive modified construction of one very well known type of simple mount, making the mount self-locking. The present invention provides an extremely simple and inexpensive form of mount suitable for use with a wide range of animals. Both the added cost and the added manipulation by the attendant are so small as compared with the simplest non-locking assemblies, such as simple hooks, that the present construction is fully suitable for more or less universal use with laboratory animals requiring a security of mount less than the extreme requirement represented by animals such as monkeys.

As will hereinafter be seen in greater detail, the present invention employs a simple form of hook or bracket generally resembling mounts heretofore employed, but made self-locking by a novel form of locking or latching provision obtained by the shaping or configuration of a small portion of the assembly, readily and simply produced in production operations with essentially negligible cost. The structure of the invention is best understood from description of the embodiments illustrated in the drawing, in which:

FIGURE 1 is a perspective view of a drinking-bottle assembly made in accordance with the invention, the cage upon which the assembly is mounted being shown schematically in dotted outline;

FIGURE 2 is an enlarged view in vertical section taken along the line 2—2 of FIGURE 1;

FIGURE 3 is a side elevational view of a water bottle clip in its self-locking support, constituting a portion of the device of FIGURES 1 and 2;

FIGURE 4 is a top plan view of the structure of FIGURE 3;

FIGURE 5 is a fragmentary front view of a portion of the structure of FIGURES 3 and 4;

FIGURE 6 is a fragmentary view illustrating the camming action which occurs in the insertion of the clip;

FIGURE 7 is a fragmentary view illustrating the camming action which occurs in removal of the clip; and FIGURE 8 is a view partially in section and partially in elevation showing a modified form of the invention.

Details of overall constructions of the cage, apart from the drinking-bottle assembly, are of course immaterial, and FIGURE 1 accordingly illustrates the cage in the form of a mere dotted outline. The drinking-bottle assembly 12 of the illustrated embodiment of the invention is mounted on the front 10 of the cage, on a conventional panel 14, apertured at 16 to pass the drinking tube. There is also shown a feeder aperture 18, in front of which there is mounted in use (not shown) any suitable form of feeder, this portion of the assembly constituting no part of the present invention.

The usual drinking bottle 20, inverted and provided with a rubber plug or cork 22, through which extends a drinking tube 24, protruding downwardly and inwardly through the aperture 16, is illustrated. The bottle 20 is held in a generally C-shaped clip 26, having its ends 28 outwardly bent to permit the bottle to be snapped into and out of the clip. The rear portion of the clip 26 is formed with a rearward offset at 30, which serves to mount it on the self-locking bracket assembly generally designated 32.

The bracket assembly 32 is formed from a unitary strip 34 of heavy-gauge stainless steel or similar material, of a thickness to be generally rigid (approximately one-sixteenth in thickness in one desirable construction), but sufficiently resiliently yielding to permit very slight bending at the lower end upon the application of the wedging force hereinafter described. The strip 34 has a mounting portion 36 which is secured to the panel 14 in a suitable manner, as by spot-welding, at its upper end. The clip-supporting bracket portion of the strip 34 consists of a backing portion 38, which is slightly forwardly offset from the mounting portion 36 and the panel, and a clip-engaging portion 40, formed by a reverse bend at the lower end which slightly spaces the two portions to form a slide or slot therebetween.

The structure as thus far described is generally similar to a form of mount or bracket heretofore employed for similar purposes. However, in the present construction, the upper end of the engaging portion 40 is formed with a locking lip 42 of novel configuration. The lip 42 is bent to form a closure at the upper end of the slot between the backing and clip-engaging portions, sloping upwardly and rearwardly. As best seen in FIGURE 5, the upper edge of the lip 42 is tapered in width, preferably rounded. With this configuration, only the central portion of the upper rear edge of the lip 42 contacts the backing member 38, and there is a progressively increasing gap between the lateral portions of the upper rear edge and the backing member. At the sides, this gap is sufficient to pass the thickness of the portion 30 of the clip. Accordingly, as shown schematically in FIGURE 6, the lower edge of the portion 30 of the clip may be inserted at either of the corners (with the clip slightly tilted for this purpose at the commencement of insertion) and downward motion of the clip exerts a wedging or camming action on the sloping upper edge of the lip 42, which is accordingly forced open by such insertion, as shown in dotted form in FIGURE 6. In generally similar fashion, when the engaged portion 30 of the clip is moved upward, wedging or camming action opens the slot at the top, the initial portion of such opening motion being illustrated in FIGURE 7.

It will thus be seen that the clip or holder 26 may be inserted or removed by simple vertical motion with force merely sufficient to open the top of the slot or slide with the aid of the wedging action provided. However, the latching or locking of the clip within the bracket is readily made sufficiently secured so that the clip and bottle are not readily removed from the support by the upward force which may be exerted by a small animal within the cage. The clip 26 may thus be readily removed and replaced as a more or less independent unit whenever this is desired.

As will be readily apparent, this simple self-locking construction is obtained with completely negligible addition of cost of fabrication.

The modified embodiment of FIGURE 8 is generally similar in most respects, but in this embodiment the bracket 32a employs as the backing portion the body of the panel 14a. The mounting portion 36a is again an integral part of the same unitary strip 34a which forms the engaging portion 40a terminating in the upper lip 42a. However, in this embodiment, the mounting portion 36a extends downwardly from the engaging portion 40a and the spacing of the latter from the backing member is obtained by a small offset in the strip 34a, rather than the reverse bend employed in the embodiment previously described.

Persons skilled in the art will observe that the teachings of the invention may be employed to devise drinking bottle assemblies differing in appearance and details from the two embodiments illustrated, but which nevertheless utilize teachings of the invention. Accordingly, the scope of the protection to be afforded the invention should be determined from the definitions of the invention as described in the annexed claims, and equivalents thereof.

What is claimed is:

1. An animal cage drinking-bottle asembly comprising:
   (a) a wall portion having an aperture,
   (b) an inverted water-bottle having a rigid drinking tube with its lower end seating in the aperture,
   (c) a water-bottle holder engaging the water bottle and having a vertically extending support plate portion at the rear thereof,
   (d) and a self-locking support bracket above the aperture engaging the support-plate portion of the holder,
   (e) the bracket comprising a generally flat vertical backing member and a generally flat holder-engaging member of thickness greater than the plate portion facing the backing member and attached thereto and spaced therefrom at the lower end to form therebetween a slot receiving the plate portion of the holder,
   (f) the upper end portion of the holder-engaging member sloping upwardly and rearwardly toward the backing member and having the upper edge thereof tapered in width to provide a progressively increasing gap between portions of said edge and the backing member, the gap passing the thickness of the support-plate portion of the holder at an end of said upper edge,
   (g) the holder-engaging member being forced away from the backing member by wedging action of the lower edge of the plate portion of the holder against the upper edge of the holder-engaging member in inserting the holder and by wedging action of the upper edge of the plate portion of the holder against the sloping inner surface of the holder-engaging member in removing the holder.

2. The drinking-bottle assembly of claim 1 having the holder comprising a generally C-shaped clip having a rearward offset forming the plate portion.

3. The drinking-bottle assembly of claim 1 having the upper end of the holder-engaging member tapered in width so that only the central portion of the upper edge contacts the backing member.

4. The drinking-bottle assembly of claim 3 wherein the taper is a rounded curve.

5. The drinking-bottle assembly of claim 1 having the holder comprising a generally C-shaped clip having a rearward offset forming the plate portion and having the upper end of the holder-engaging member rounded to contact the backing member only in the central portion.

6. The assembly of claim 1 having the backing member and the holder-engaging member formed from a single strip reversely bent at the bottom end.

7. The assembly of claim 1 having the backing member integral with the wall, the holder-engaging member being the upper portion of a vertical strip having a lower support portion mounted against the wall and having a forward offset between the lower and upper portions forming the spacing at the lower end of the holder-engaging member.

References Cited by the Examiner

UNITED STATES PATENTS

| 2,311,207 | 2/1943 | Bussey | 119—18 |
| 2,653,569 | 9/1953 | Forester | 119—18 |
| 3,234,907 | 2/1966 | Palencia | 119—17 |

ALDRICH F. MEDBERY, *Acting Primary Examiner.*

SAMUEL KOREN, HUGH R. CHAMBLEE, *Examiners.*

UNITED STATES PATENT OFFICE
CERTIFICATE OF CORRECTION

Patent No. 3,320,929                                                May 23, 1967

Harry H. Kay

It is hereby certified that error appears in the above numbered patent requiring correction and that the said Letters Patent should read as corrected below.

Column 3, line 20, before "drinking" insert -- rigid --; line 74, for "secured" read -- secure --.

Signed and sealed this 14th day of November 1967.

(SEAL)
Attest:

Edward M. Fletcher, Jr.                                EDWARD J. BRENNER
Attesting Officer                                              Commissioner of Patents